United States Patent [19]

Mckee

[11] Patent Number: 5,568,391
[45] Date of Patent: Oct. 22, 1996

[54] AUTOMATED TILE MOSAIC CREATION SYSTEM

[76] Inventor: Lance D. Mckee, 10 Circuit Ave., Worcester, Mass. 01603

[21] Appl. No.: 95,258

[22] Filed: Jul. 22, 1993

Related U.S. Application Data

[63] Continuation of Ser. No. 529,447, May 29, 1990, abandoned.

[51] Int. Cl.$^6$ .................................................. G06F 19/00
[52] U.S. Cl. .......................... 364/469.01; 364/473.01; 364/477.01
[58] Field of Search .................................. 364/468, 469, 364/470, 471, 472, 473, 474.24, 474.23, 477, 503, 476; 156/560–562; 52/391

[56] References Cited

U.S. PATENT DOCUMENTS

| | | | |
|---|---|---|---|
| 4,056,714 | 11/1977 | Al-Shaikh et al. | 364/469 |
| 4,698,192 | 10/1987 | Kuze et al. | 101/126 |
| 4,718,017 | 1/1988 | Hutton et al. | 364/470 |
| 5,271,200 | 12/1993 | Witt | 52/391 |
| 5,443,680 | 8/1995 | Gerber | 156/362 |

Primary Examiner—Roy N. Envall, Jr.
Assistant Examiner—Thomas E. Brown
Attorney, Agent, or Firm—Jerry Cohen; Harvey Kaye

[57] ABSTRACT

Tile mosaics are created for architectural decorative surfaces or other purposes using mosaic design system linked with a manufacturing sequence to enable efficient design of mosaics and complex filings, implemented in a production line with elements for continuous cutting (46), drying (56), firing (58), glazing (52), glaze-firing, diamond film coating (64), application of resilient backing, labeling, and packaging (68) of matted sections of tiles (T) of ceramic or other materials, of any shape, size, or orientation, in which the tiles in a section are held together by embedded wires (39) or by bonding edge-to-edge.

31 Claims, 12 Drawing Sheets

AUTOMATED TILE MOSAIC CREATION SYSTEM

This is a continuation of application Ser. No. 07/529,447, filed May 29, 1990, now abandoned.

BACKGROUND OF THE INVENTION

The present invention relates generally to the computer-aided design and manufacture of custom tile mosaics of ceramic or other materials. Much of the description of the process and apparatus refers specifically to the production of ceramic tile mosaics, the preferred embodiment, but the same basic procedures apply in producing mosaics from other materials.

Current commercial ceramic tile-forming methods include ram-pressing, dry-pressing, and extrusion. All produce in a single run many tiles of the same size and shape, and they are all usually glazed with a single color, in a typical mechanical mass production fashion. When conventional tiles are installed, some must be cut to fit, which requires time and produces waste.

In the tile industry of the 1980's "mosaic tile" refers to small tiles, usually matted (glued in square arrays to perforated paper, plastic, or fabric backing for easy installation), and usually all the same shape and color. Some multi-color and multi-shape matted tile patterns are available as stock items. Also available as stock items, intended to meet the increasing demand for decorative tiles, are larger non-matted square tiles stamped and/or printed with mosaic patterns or other designs.

There is a growing demand for finely detailed architectural ornament, but there has been no way to design and produce affordable custom ceramic mosaics and complex geometric tilings. Making mosaics by hand and making tiles of complex shape by hand are time-consuming and require special skills.

In 1988 and 1989, at least two companies (Colorco, in Merrimack, N.H. and Digitile in Seattle, Wash.) began using microcomputers to offer a partial solution to this problem. In their schemes, pixels in the scanned-in image on the computer's display are resampled to a single size that represents the size of the tiles that will comprise the mosaic. Then the mosaic design is divided by software into installable-sized sections (1 foot by 1 or 2 feet, for example). These sections are manufactured from already-fired and glazed square or round tiles, either by hand on computer-printed patterns or by use of a pick-and-place robot that picks up tiles of different colors and places them appropriately on glue-covered mats. The disadvantage of the mosaics produced by these schemes is that edges and lines in the design that are not horizontal or vertical have stair-stepped edges, similar to many other displays and outputs of images generated by computers. The tiles in these mosaics are all the same size, and are all in even rectilinear rows and columns. Reducing pixel size, i.e. tile size, improves the appearance of these mosaics, but the stair-stepping problem can never be eliminated with this approach.

The state of the art of advanced methods of tile mosaic creation and in other fields brought together through the present invention is exemplified in the above-described schemes and in the following:

| U.S. Patent Documents | | |
|---|---|---|
| 4,868,003 | Temple et al | 427/50, 118/715 |
| 4,698,192 | Kuze et al | 264/101 |

Other Publications

*Filings and Patterns*, Grunbaum and Shephard, 1986, W. H. Freeman & Co., New York, N.Y.

*Tile and Decorative Surfaces* 39:59 November, 1989, published by Tile and Decorative Surfaces Publishing Co., Woodland Hills, Calif.

*Chemical Engineering News* 67:24–39 May 15, 1989

Another problem or need addressed by the invention described herein is the lack of texturally interesting and durable output options for computer artists. Artists who work with computer graphics have always been limited by the available output devices. The spatial and color resolution available on film and paper hardcopy continues to improve, but these media are texturally flat and uninteresting, and unsuitable in general for outdoor use or architectural decoration.

Principal objects of the invention comprise resolution of each of the above cited problems, needs, or disadvantages of prior systems of tile production and digital image hardcopy.

It is a further object of the invention to provide a new way to design mosaics and complex tilings for manufacture, using computer-aided design and raster-to-vector image processing techniques.

It is a further object of the invention to provide a means of efficiently manufacturing one-of-a-kind decorative tile mosaics, each unique in an artistic sense, and composed of matted custom-colored tiles of any size, shape, and orientation, including very small tiles with no visible gaps.

It is a further object of the invention to provide custom-made batches of matted tiles, each batch manufactured for an area with particular dimensions, potentially eliminating the usual cutting and fitting required during installation, and reducing the need for manufacturers and retailers to inventory large volumes of tiles.

It is a further object of the invention to enhance tile durability and to enable for the first time the practical use of brightly colored low-fire glazes on floor tiles, glazes that are by themselves too soft to be used on floors, by means of ultra-hard coatings.

It is a further object of the invention to combine the durability and beauty of ceramic tile with the advantages of resilient flooring by laminating matted sections of very small tiles onto a resilient underlayment, or installing them on a resilient underlayment, with flexible grout between the tiles, a scheme which would not be effective with tile sizes now in common use.

It is a further object to achieve not only compatibility, but mutual enhancement, in combinations of features meeting multiples of the foregoing objects.

SUMMARY OF THE INVENTION

The foregoing objects are achieved by a process, apparatus and system affording in-line customization in the large-scale production of tiles.

Custom designs are produced by mosaic design software described herein, which consists of user application modifications of commercially available architectural CADD systems. These modifications enable architects and others to efficiently design mosaics, such as replications of classical mosaics, and complex tilings, such as those shown in FIG. 11, for architectural surfaces. Mosaic manufacturing software described herein controls devices in a production line, resulting in essentially continuous cutting, drying, firing, glazing, glaze-firing, chemical vapor deposition coating, labeling, and packaging of conveniently interlocking matted sections of small ceramic tiles.

Those skilled in the art of building material manufacturing processes will appreciate, after review of the present patent's disclosure, that with some alterations the same basic process can be used to make tile mosaics of other materials. Thin slabs of partially set concrete or terrazzo, for example, could be substituted for clay, and a long conveyor holding the matted sections of these tiles during the curing period could be substituted for the ceramic system's drier, kiln, and cooler. Or, thin slabs of loosely agglomerated bits of plastic resin could be substituted for clay, and a curing oven substituted for the drier, kiln, and cooler. Edge-to-edge bonding is feasible with plastic tiles, and might obviate the need for embedded matting wires. The chemical vapor deposition coating procedure described below is an option available on materials that can endure the temperatures involved, and for particular uses that justify the added expense.

Non-architectural applications of the present invention are intended, as are applications involving very large or very small tiles.

The following is a non-limiting overview/summary of a basic portion of the process, apparatus, and system of the invention, generic to many, but not all, its potential embodiments.

A designer uses mosaic design artifacts described below (as a portion of the present invention) to create a mosaic design for a floor, wall, or other surface. The design consists of many small (at full scale, typically ¼"–3" across in the preferred embodiment), colored, polyline-bounded areas that depict tiles. The design may reside in a digital CADD drawing tile that may be displayed electronically or presented as output to a plotter as in conventional CADD drawing practice.

The design tile is convertible into instructions that control a series of manufacturing devices. Such conversion can be effected automatically via mechanical or computer means. Preferably, software controls the entire conversion. Those devices comprise clay sheet feed equipment, mesh-embedding apparatus, a fluid jet (e.g. water jet) cutter, glaze deposition apparatus, clay heating apparatus such as a conveyor kiln or the like, overcoating apparatus and labeling/packing equipment as well as control equipment for the foregoing.

The conversion involves a division of the design into standard sections, typically approximately one foot square, each section containing many adjacent tile outlines; control of an x-y positioner moving a medium pressure water jet that cuts the tiles from moist clay, one section at a time; and control of a mechanical raster device similar to an inkjet printer, or alternatively another or the same x-y positioner with a set of glaze-application nozzles instead of a cutting nozzle, that applies glaze to the tiles in a section, either before or after the tiles are first fired. (FIG. 2 shows a single-firing process, in which glaze is applied to not-yet-fired tiles.) The sections of tiles move through the system on a set of conveyors designed to handle the particular consistencies of the material and which enable maximization of kiln throughput in a conveyor kiln which might be several lanes wide.

The tiles in a section are held together by a mesh of high-melting-point wire or other type of metal screen or expanded foil embedded in the clay. The wires around the perimeter of a section are trimmed by hand or by laser, or else they are cut selectively and individually, under computer control, just before they are embedded in the clay, eliminating the need for trimming. By thus embedding only the wires needed, no wire is wasted. The wire connecting the tiles remains intact and embedded in the tiles through cutting, firing, glazing, coating, labeling, packing, shipping, unpacking, and installation.

Clays used as raw material for the tiles are formulated to shrink little, warp little, vitrify quickly at a temperature below the melting temperature of the wire, and yet be hard and strong after firing. Materials other than clay are likewise formulated to maintain their shape through subsequent processing. Ceramic tiles are usually manufactured to have spaces between tiles into which grout is applied during installation. Tiles of other materials, such as plastic resin, might be manufactured to have no space between tiles, but rather a bonding of tiles edge-to-edge. This enables manufacture of one-customer batches of resilient flooring of custom design. In another embodiment, these materials are combined in a product consisting of very small, thin, strong, ceramic tiles laminated onto a resilient underlayment, or installed onto a resilient underlayment, with flexible grout applied at installation, thus providing the hardness and durability of ceramic tile with the comfort and safety advantages of resilient flooring.

The tiles are optionally coated after glazing with a thin diamond-like film to enhance durability, shine, and color. This is not a glazing process, but a chemical vapor deposition process. The hard film protects soft, low-fire, brightly colored glazes so that these glazes can be used on floor tiles in high-traffic areas. Alumina grit or other hard refractory materials might be embedded in the glaze before coating to increase the friction coefficient of the finished tile.

The entire production process, including labeling and packing, may be computer-controlled or otherwise automated with stored program control.

Computer-generated removable printed instructions attached to each 1'×1' matted section of tiles guide the tile installer, who installs the mosaic using ordinary methods and materials, with no special training. The usual cutting and fitting required during installation is unnecessary if the dimensions of the design match the built dimensions of the area to be tiled. If the exact dimensions are not known, a trimmable border can be added by the designer to the design. The finished mosaic reveals no 1'×1' grid, because the tiles along the uneven, interlocking edges of two adjacent sections fit together perfectly, leaving, in the case of ceramic tiles, a grout gap of a width equal to the gaps between tiles within a section.

Because the mosaics produced by the present invention consist of tiles of any shape and any orientation, and because computers can quickly replicate and manipulate geometric patterns, the present invention makes it easy to design and manufacture (a) regular (symmetric) tilings with complex geometiles, like those seen, for example, in Moslem architecture, or in FIG. 11;

(b) replicas of classical mosaics, in which most of the small tiles are roughly square, but laid in non-rectilinear rows, with irregular grout gaps;

(c) Penrose tilings, tilings derived from fractal geometry, Escher tilings, tilings derived from natural patterns, constrained random tilings, and other tilings either too new or too complicated to have previously been used for ceramic architectural finishes;

(d) any of the above tilings, warped, conformed to bounding curves, or otherwise distorted in ways that are easy with a computer but very difficult without a computer, and/or (e) pictorial or abstract mosaics created using vectorized scanned images and/or computer graphics. Areas in these designs can be tiled with any of the patterns described above.

Other benefits include provision through the invention as follows:

(f) A way to custom-manufacture tiles for floors, walls, countertops, signs, etc., or thick paving tiles, or tile assemblies for other purposes, that are made to fit the areas in which they will be installed. The tile installer is provided with a diagram that shows where each numbered section fits. The labor required to cut and fit architectural tiles around a floor drain, for example, is eliminated because the manufactured matted sections of tiles leave space for the floor drain. The system can serve this custom-fit purpose alone, with no artistic design intended by the designer.

(g) A way to incorporate computer-generated designs (or electronically scanned hand-drawn designs, photos, or other images) directly into the built environment as a very durable architectural finish. Designs generated with almost any graphics software can be convened by various commercially available conversion programs to the standard file format of the CADD software and then "mosaicized" using the mosaic extensions to the CADD software. This gives muralists, interior designers, computer artists and others a new, more durable, more texturally interesting medium. Because the mosaic CADD software is compatible with standard file formats used in architectural CADD programs, the mosaic can be designed in a floor plan or elevation copied from an architectural drawing and viewed in place on the computer screen or in a plotted drawing using the architectural CADD program's 3D viewing and plotting functions. This gives architects the ability to provide their clients with realistic previews of planned mosaic installations.

(h) A way to make graphic images that are extremely resistant to wear and fading. Because of the durability of ceramic and the fade-resistance of ceramic colors, pictures made of tiny ceramic tiles would offer significant advantages over photographs, prints, and paintings. A miniature-tile embodiment of the present invention is intended, by which very high resolution hard images could be made from digital images.

(i) A way to manufacture tiles for tiling of non-flat surfaces. The mosaic CADD software can calculate, display, and assign to matted sections the small flat tiles required to cover, for example, a teardrop-shaped ceramic fireplace or woodstove. Or in combination with the embodiment mentioned in (h) above, and with adaptations of currently available software such as that used to "mosaic" images of the earth from space and to map textures over three-dimensional computer-generated objects, the present invention offers a way to make what are essentially three-dimensional color photographs, a goal not attainable with current gel-layer photographic technology.

(j) A way to cut individual tiles of any shape, for uses other than mosaics, whether in architecture or in other applications.

The present invention applies CAD/CAM technologies to an ancient art, producing extremely durable decorative surfaces with unlimited design possibilitiles and enables continuous automated production of unique custom products, products that may be designed by the customer. In addition to mosaics that are pictorial or abstract, e.g. classical mosaics in churches or Roman ruins, this system produces complex geometric tilings consisting of tiles of any shape. These complex tilings can be produced and manipulated in ways virtually impossible and surely impractical by conventional manual means, and they are available as design elements to the designer of a pictorial or abstract mosaic.

While other tile manufacturing schemes may have been tried that involve cutting tiles in place relative to each other, keeping them in place has undoubtedly been a serious obstacle to scaled-up manufacturability. The tiles must somehow be kept in place relative to each other from the time of cutting to the time of installation. The tiles shift as they shrink during firing, and they shift as they move through the production line, so gluing them to mats after firing wouldn't solve the problem. Mosaics have not previously been made with embedded matting wires. Conventional matted tiles are manually or mechanically glued to mats after final firing and cooling.

CAD-driven mechanical routers, laser cutters, and very high pressure water knives are available and in use in various other manufacturing processes, including the cutting of marble floor tile inlays by World Marble Designs, Fairfield, Iowa, U.S.A. However, an open-bottomed x-y positioning device in combination with a stream of water strong enough to cut the raw material but weak enough not to cut or dislodge embedded matting wires has not previously been used for making mosaics.

There is no evidence in the indices to the literature of art, ceramics, computers, or U.S. patents that computers have been used to design or form the shapes of individual tiles.

There is a need in the system described herein, and in other unrelated industrial operations, for a computer-controlled nozzle. Various automated systems that use nozzles might be more effective if a nozzle were available that could be adjusted continuously during use in response to commands from a computer. Such an innovative nozzle is provided, and described herein, as a means of producing variable gap widths between tiles as the tiles are cut.

A problem with all flooring materials is that they are subject to wear. The manufacturing process described herein includes a chemical vapor deposition coating procedure for ceramic, glass, stone, and other flooring materials capable of withstanding the high vacuum and high temperatures involved in this coating process. Chemical vapor deposition of diamond and diamond-like coatings is a maturing technology described in recent patents and published articles (see for example, U.S. Pat. No. 4,868,003 and Chemical Engineering News 67:24–39 May 15, 1989). The present invention uses this technology to coat floor tiles with diamond (or polycrystalline diamond, or other diamond-like materials such as transparent boron nitride) to achieve great durability through extreme surface hardness, and also great shine, through diamond's very high index of refraction.

In addition to extending the useful life of the tile and eliminating the need for wax or other finishes, this hard coating will enable the use on floor tiles of brightly colored glazes. Currently, glazes for floor tiles must be fired at high temperatures because they must be high in alumina and/or silica content and low in flux content in order to be very hard. But brightly colored glazes in general are low-fire glazes because the brightly colored inorganic compounds are unstable at high temperatures. They are soft because of their high flux content, necessary for the formation of glass at lower temperatures. A thin film of diamond solves this problem by protecting the soft low-fire glazes from abrasion. Wall tiles so treated would be unaffected by sandblasting used to remove graffiti, and if the tile body were made of modern high-strength ceramic, the tiles would be like armor, much stronger than the underlying concrete.

Other objects, features and advantages will be apparent from the following derailed description of preferred embodiments thereof taken in connection with the accompanying drawings.

DETAILED DESCRIPTION OF PREFERRED EMBODIMENTS

Figure 1:
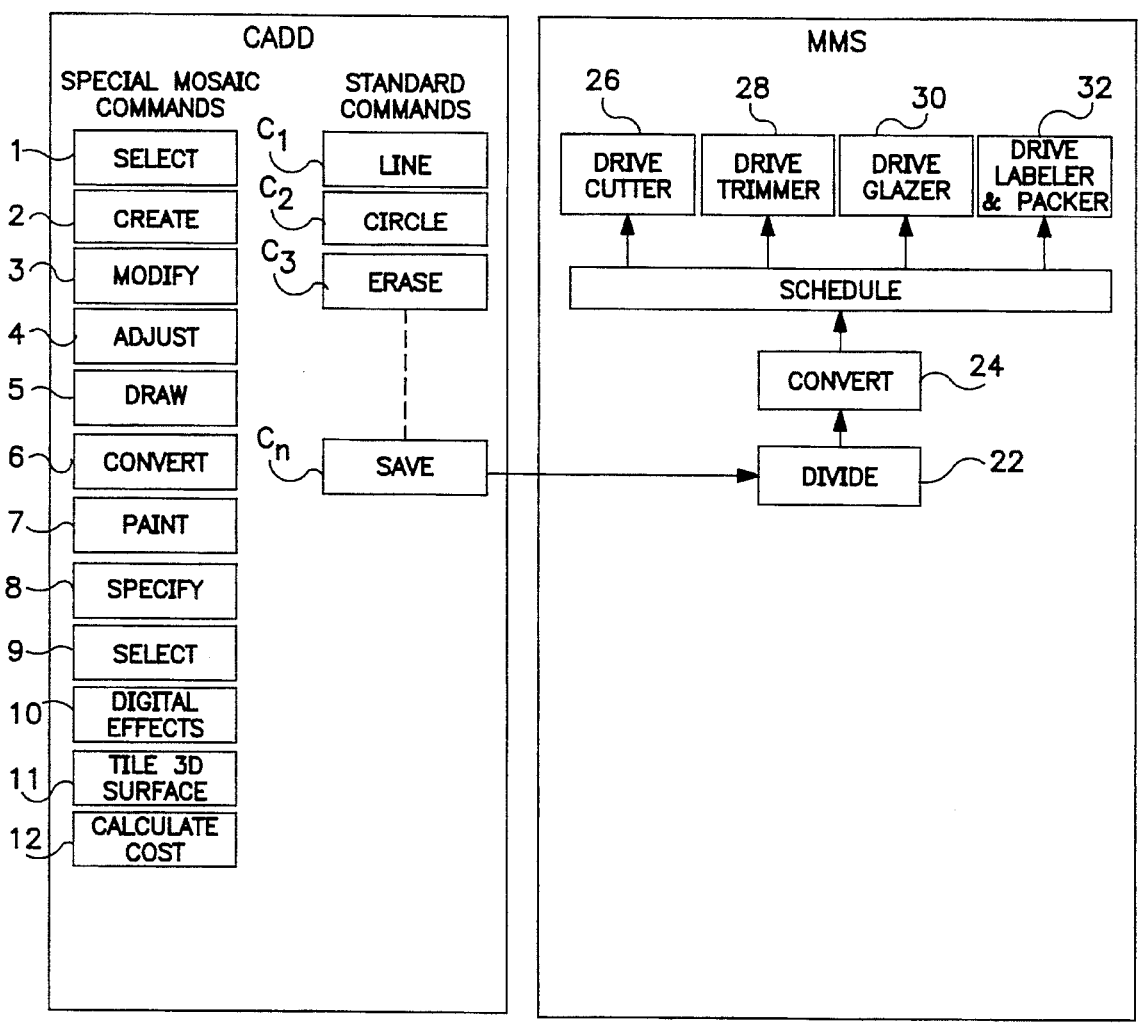
FIG. 1 is a block diagram showing the relationship of the mosaic design software in a preferred embodiment of the invention to commercially available CADD software, and to the manufacturing software.

FIG. 1 is a block diagram that shows the relationship of the mosaic manufacturing software (MMS) of a preferred embodiment of the present invention to the commercially available CADD software which is enhanced for designing mosaics. The designer runs mosaic design programs, 1 through 12, and also standard commands C1–Cn, using the CADD software's standard command line interpreter and/or menu-and-mouse user interface. The usual operations involved in designing a mosaic, and the mosaic design programs contained in the preferred embodiment of the mosaic design software are listed below:

(a) Specifying a CADD-generated area to tile. This will typically be a floor plan or other surface copied directly from a CADD building design, and it will be used as a perimeter for the mosaic. The fast step in designing a mosaic will be to set the perimeter using standard commands such as C1 and C2. If a plan or elevation accurately portrays the dimensions of the space to be covered, the manufactured mosaic can be installed with no cutting and no waste. If more than ¼" difference is expected between the plan and the actual area, the designer can add a trimmable border.

(b) Basic tiling. Program 1 enables the designer to choose from a menu a tiling, usually a repeating complex pattern, that will "tile the plane" of a specified area. The large number of available tilings includes, in addition to traditional floor tiling patterns and a selection of patterns from the literature of tiling mathematics, patterns drawn from natural and man-made objects, such as Islamic tiling patterns, bubbles between glass panes (non-repeating), the semirandom cracks in dried mud (non-repeating), and woven patterns. These are presented on a menu. Fractal geometry and Penrose tiling, two recently popular topics in geometry, are available for experimentation and incorporation into mosaics, as are Escher-like tilings.

(c) Create new tiling. Program 2 enables the designer to create a new pattern using the "Conway theorem" (see Grunbaum and Shephard) or else selecting types of symmetry from a submenu and then drawing lines which the program duplicates simultaneously at various angles and positions determined by these symmetry rules. (This technique of generating patterns is prior art embodied in Crystal Paint, a software product of Great Wave Software, Inc., and is not claimed as part of the present invention.) Either of these schemes creates a new pattern to add to the patterns in the pattern menu. Complex geometrical patterns of all kinds can be generated, and the mosaic design software offers an intuitive and interactive method of editing these, transparently altering the variables in the mathematical expressions that determine the patterns. The principal technique is to click onto a vertex or edge of a tile (in a "unit box" window that shows all the tiles in one unreplicated tiling) and move it. The software adjusts all the other vertices and edges to maintain conformance to the mathematical rules for that tiling.

(d) Tiling Modifications. Program 3 enables the user to
  (d1) Scale a pattern. Within the limits of the manufacturable tile sizes, patterns can be evenly reduced or enlarged in scale.
  (d2) Rotate a pattern. Select an area, and specify a number of degrees clockwise and a center around which to rotate the pattern (as if the area were a window on a large rotating patterned area behind the window).
  (d3) Bend a pattern to fit one or more curved or angled edges of the area. Use the mouse to trace a curve on which to base the bending operation, then click again to execute the bending operation. It is easy, for example, to create curved rows of tiles to imitate the "haloing" of Van Gogh's skies around objects like sun or hills. The default is to distort tile shapes in the tiling to fit the distorted matrix. An option available with simple one-tile-shape tilings is to maintain tile size and shape, but alter the dimensions of the gaps, automatically adding or subtracting tiles as necessary. Bending a tiling of small squares, for example, yields triangular gaps.

(d4) Other warping or "rubber sheeting" options:
(d4a) Create spider-web-like or perspective-like gradations in size or shape of tiles across an area, by specifying a "vanishing point" and a ratio of large (farthest from vanishing point) to small (at vanishing point) tile sizes. These sizes must be within the manufacturable tile size limits. The opposite effect, large at the center and small at the perimeter, is another option. Size gradation can also be specified between two fines instead of between a vanishing point and an area perimeter.
(d4b) Other interesting effects, such as "waviness" and spiraling.
(e) Program 4 enables the user to resize too-large and too-small (for manufacturability) tiles by breaking up the large ones and merging the small ones.
(f) Mouse and menu driven format. The user picks editing functions, line styles, patterns, and colors from pull-down menus, while at the same time having the option of using faster keyboard commands. The look and feel will match the look and feel of the CADD program in which the commands are embedded. The user draws with the digitizing device (mouse, puck, or digitizing pen), and uses the digitizing device to select lines, tiles, or areas to receive a particular attribute or treatment, usually a color or pattern.
(g) Drawing. Basic drawing functions are provided by the host CADD program. These include horizontal, vertical, and free-form lines. An added mosaic drawing function—Program 5—enables the user to draw a row of tiles, or a swath of tiles, with one stroke of the digitizing device.
(h) Conversion of scanned images. Program 6: One of the main functions of the mosaic design software is to make a mosaic from a scanned-in image, or from a computer-generated raster image imported from some other graphics program. This involves automatically converting an image to a line drawing and then tiling the areas in the drawing with tiles of default shape and color. The software draws lines around areas of pixels of equal gray value or color. Scans of almost any resolution would yield useable mosaic software-generated line representations of images. (Common image processing algorithms, such as those that find edges between distinct color areas, and those that convert an image to a line drawing, are prior art. Using them to create a mosaic, and assigning default tiling patterns to these areas, are not functions evident in the prior art.) The menu selections are "Read raster image", and "Make Mosaic from Raster Image". This selection returns a prompt asking for a file name, and a name to give the processed image.
(i) Control of color. Program 7: Coloring ceramic accurately requires expertise and careful control of factors such as heat, glaze composition, and kiln atmosphere. There are limitations. The ceramic design software provides pallettes, or sets of harmonious colors that can be applied and fired together. Each mosaic design uses only the colors from a single pallette. Computers with graphics subsystems having only 8 bit planes but also 8-bit DACs will be able to accurately represent these pallettes of colors. Giving tile customers and independent designers a computer graphics pallette for designing with glazes is a feature not evident in the prior art relating to tile design and manufacture.

For monocolor graphics systems there is a number coding system by which a user can view a "paint-by-numbers" image of the mosaic, in which colors are indicated with monocolor area fill patterns within each tile, shading them. A printed color sheet in the manual provides all users with an accurate representation of the glaze colors.

Usually, each tile has a single color. But this invention enables also multiple colors per tile, or "chiaroscuro"—blending of colors across a tile, or effects such as one color at the center of each tile blending to a different color at the tile's perimeter.

The user can manually or automatically assign colors to tiles and regions of tiles. The method is to either select an area and then select a color, or select a color and then "paint" an area.

A designer can leave large or small areas of a mosaic open for insertion of tiles of other materials, such as semiprecious stones or pieces of metal, or for accommodation of floor drains and wall outlets. The color "No tile", "Empty", or "Open" is on each pallette.

(j) Control of gaps between tiles. Program 8: The user can vary the widths of the gaps between tiles. The widths can be even or they can vary randomly in various ways to give, for example, the appearance of a mosaic made manually from broken bits of glass, or from tiles that are only roughly square. Variations created automatically and globally over long lines or large areas can be edited locally. Ceramic tiles shrink when drying and firing, so the minimum gap width might be a function of this shrinkage. The gaps between ceramic tiles, of course, are filled with grout at installation. Materials other than ceramic might be manufactured without gaps. The Gap submenu will offer
(j1) Uniform gaps between all tiles in the selected area. Specify gap. Range is a to z (where a, the minimum, and z, the maximum, are determined by the range available in the manufacturing process.)
(j2) Random gaps between all tiles in the selected area. Specify coarseness. Range is from 1 (slight random variations from uniform) to 10 (extreme variations from uniform, within the a to z range described above). To accomplish this, random points approximately 0.05 to 0.3 inch apart along each tile edge will be relocated from their "uniform positions" plus or minus some pseudorandom number, relative to the tile's center. These new corners optionally might or might not move across the median line of the uniform gap space into the territory of an adjacent tile whose randomized perimeter has not yet been calculated.
(j3) Shrink or expand all gaps in the selected area. Specify percentage. Specify whether to maintain size and shape of selected area (altering tile sizes) or let the selected area shrink or expand (maintaining tile sizes).
(k) Region manipulations: Program 9 enables the user to select an area by tracing or selecting a line around it, and then choose among these options:
(k1) First, specify whether you want a) partially enclosed tiles to be either included or excluded, or b) do you want fractions of tiles inside the line to be included as new smaller tiles?
(k2) Erase the tiles in the area.
(k3) Pick up the tiles in the area and move this block of tiles to another location. Release mouse button to insert this block, replacing the former contents of the covered area. (i.e., replace the newly enclosed tiles with those originally enclosed.) (The mosaic design software automatically handles tile fragments created by this or other processes, eliminating too-small-in-area tiles and "slivers", and enlarging adjacent tiles to fill the hole that is left. "Too-small" is set in a DEFINE statement to accommodate advances in manufacturing. Slivers are defined by maximum width/minimum width ratio.)

(k4) Move the outline of the area to another location, but don't disturb the tiles.

(k5) Rotate or flip the outline. Specify degrees clockwise rotation. Specify flip about vertical or horizontal axis.

(k6) Select. Select the newly enclosed tiles for some operation. Separate areas in a design can be "background joined" so that a pattern or effect is continuous across them despite the fact that they are discontinuous areas. Select multiple areas to be background using the selection techniques of the host CAD program.

(k7) Expand or shrink the area. Specify percentage.

(l) Digital effects. Program 10: Computer graphics has contributed a style of art characterized by such things as stair-stepped edges and serigraph-like color effects. The software offers some of these, effects, and provides interactive NOR, XOR, and AND pixel operations and tile overlay operations for overlaying images and tiles in interesting ways.

(m) 3-D Coverages. Program 11: Select a 3-D surface (if host CAD software supports 3-D) instead of a 2-D area to tile. (Manufacturing software will gore the design, creating flat tapered sections that will lay smoothly and edge-to-edge on the surface. The manufacturing software will also create a map that shows where to apply the sections. Some trimming of wires at installation may be necessary.)

(n) Automatic cost calculation. Program 12: A mosaic's price is calculated by the mosaic design software. That is, the mosaic design software calculates a "price factor" from number of tiles per section, number of sections, glazes used, etc. To find the price of a mosaic, the customer multiplies the price factor by a "price constant" set according to the company's manufacturing costs, profitability goals, etc., and available through a phone call. All information required at the manufacturing site for order administration, shipping, billing, accounting, customer service, and marketing studies of the installed base is contained in the mosaic data file.

Figure 3:
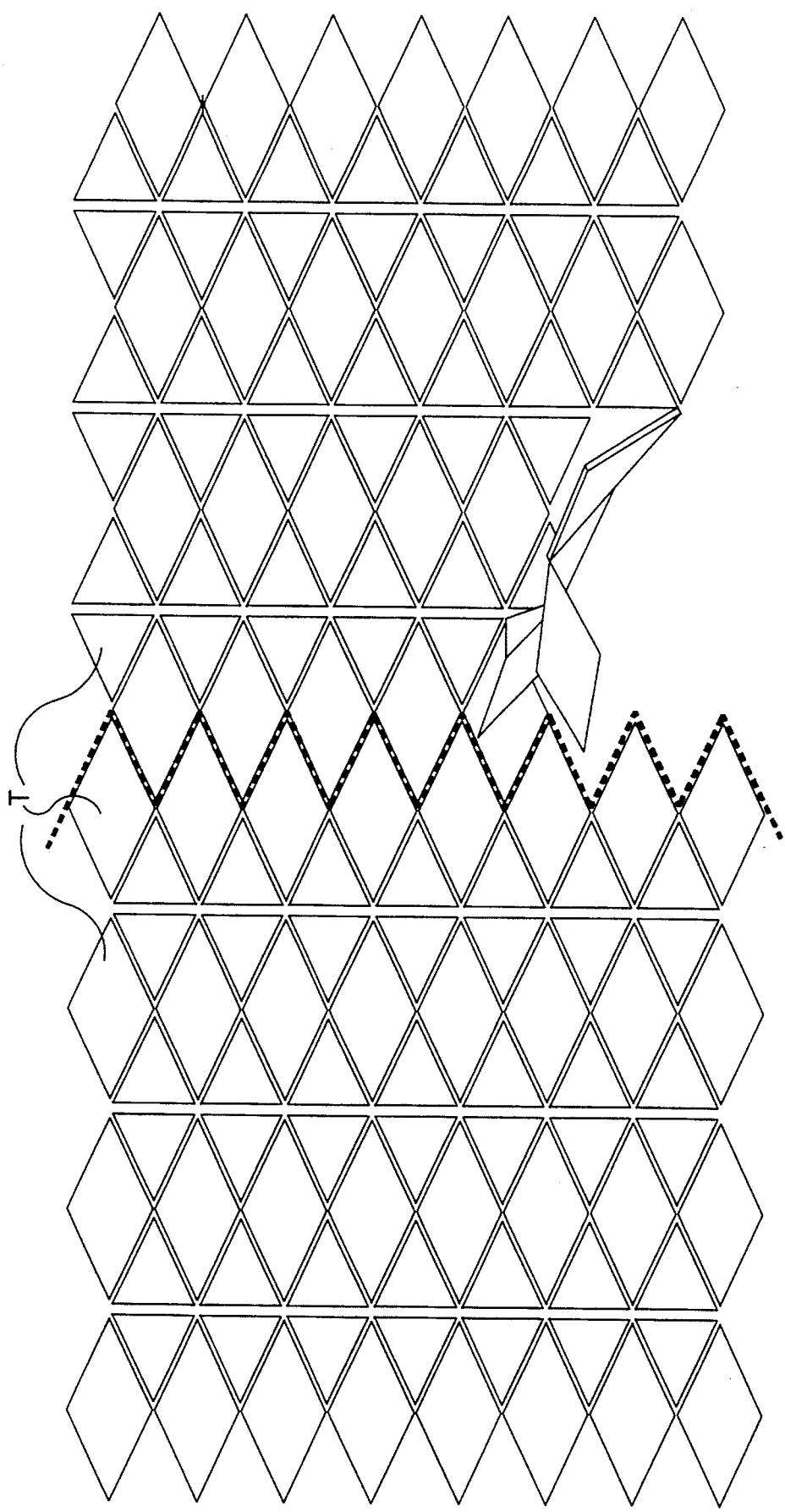
FIG. 3 is a pictorial representation of two adjacent sections of tiles, illustrating the way in which the sections of tiles install seamlessly, when made using the system in FIGS 1 and 2.

A mosaic design created with the mosaic design software must be divided into manufacturable sections. That is, the overall pattern must be broken down into individual patterns describing sections of a size that is easy to install, perhaps 1 foot×1 foot. This and other functions are handled in the mosaic manufacturing software MMS. The sectioning component 22 of MMS finds the center of each tile and determines whether the tile belongs in a particular square section or an adjacent section. This calculation is necessary because the sections are not straight-edged. The manufactured sections will lay down next to each other at installation in an interlocking fashion, like multi-piece taped-together sections of a jigsaw puzzle. See FIG. 3.

Figure 5:
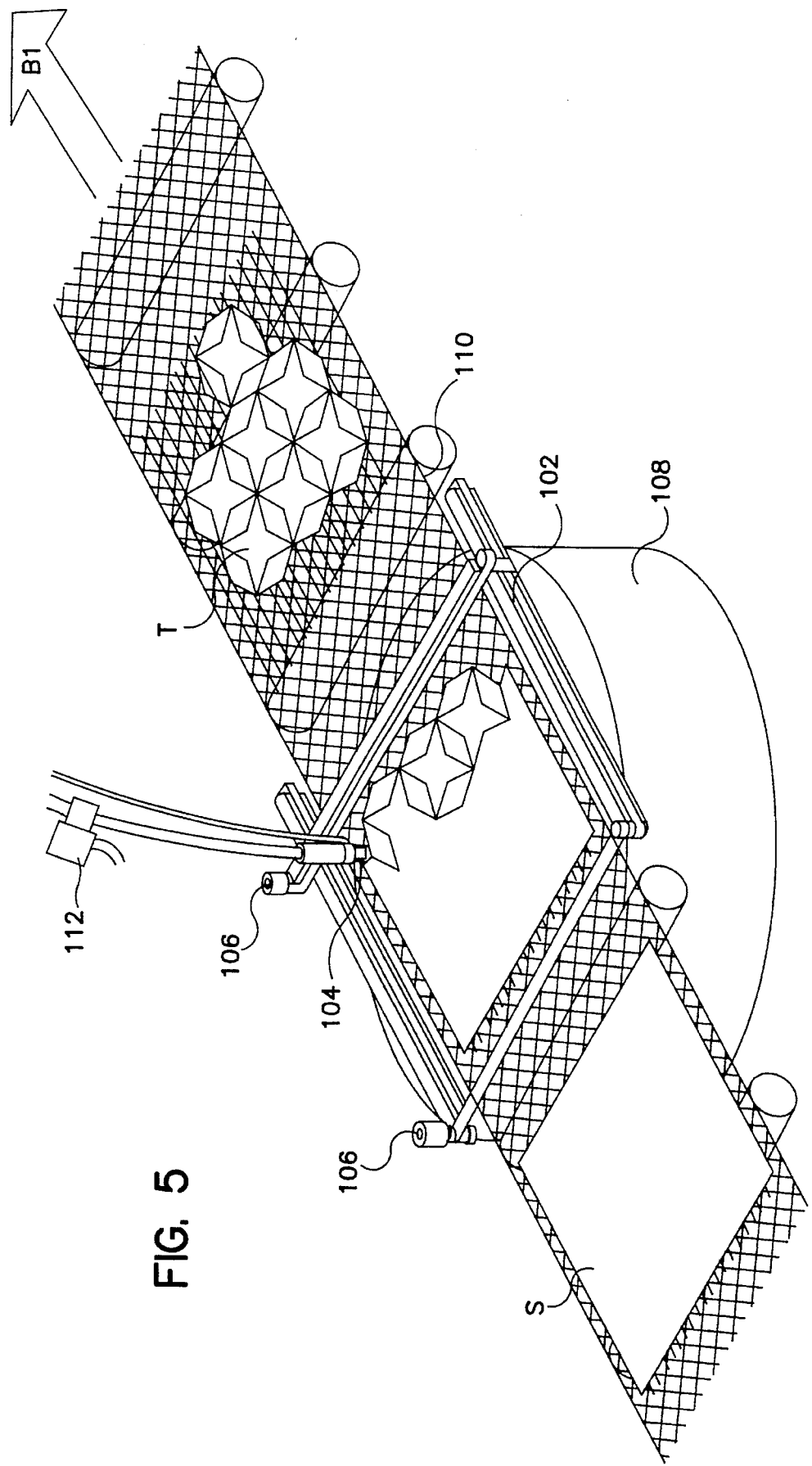
FIG. 5 is a pictorial representation of the tile cutting apparatus components in the overall production system of FIG. 2.
Figure 7:
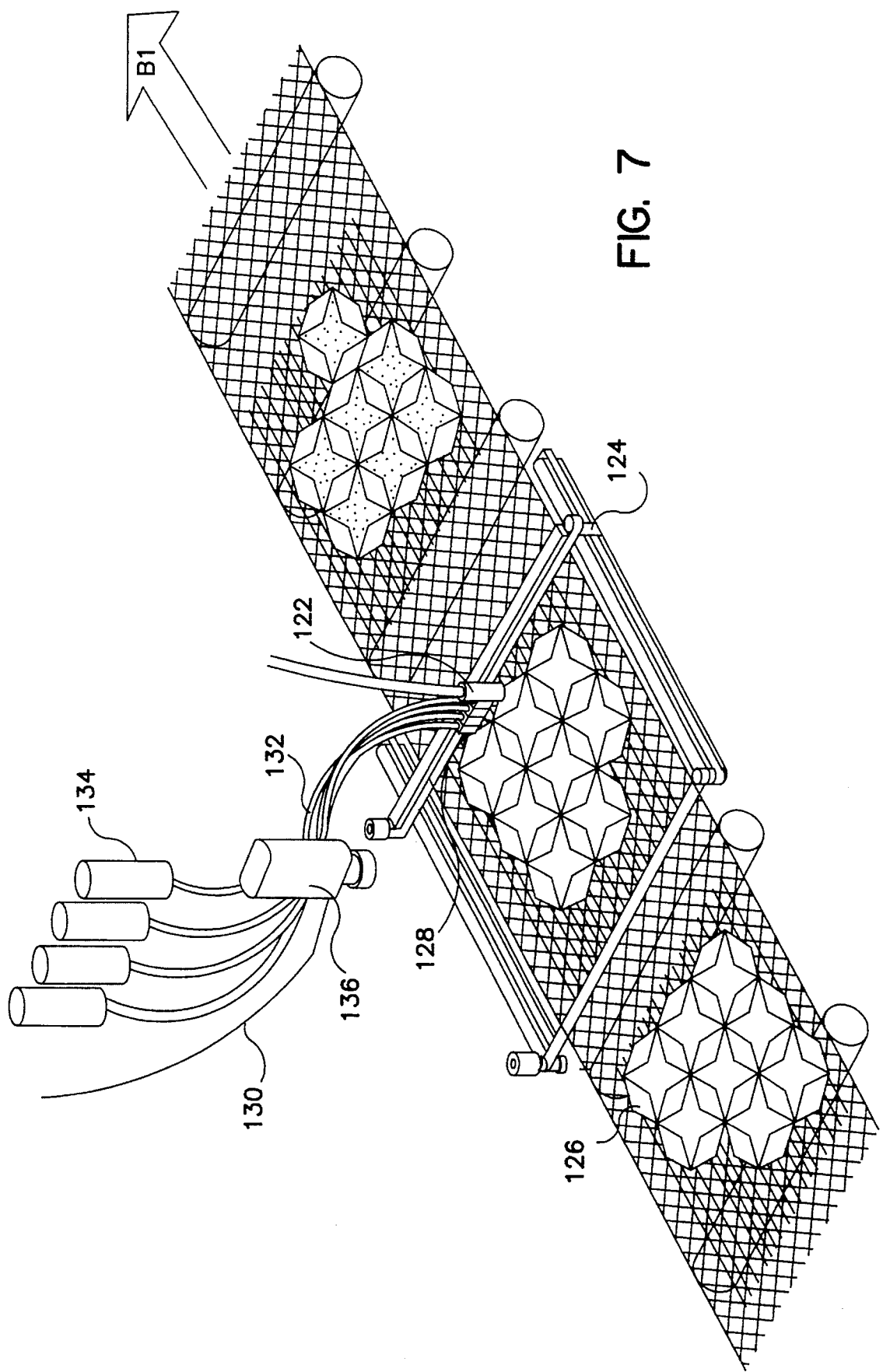
FIG. 7 is a pictorial representation of the glazing and trimming apparatus components in the overall production system of FIG. 2.
Figure 10:
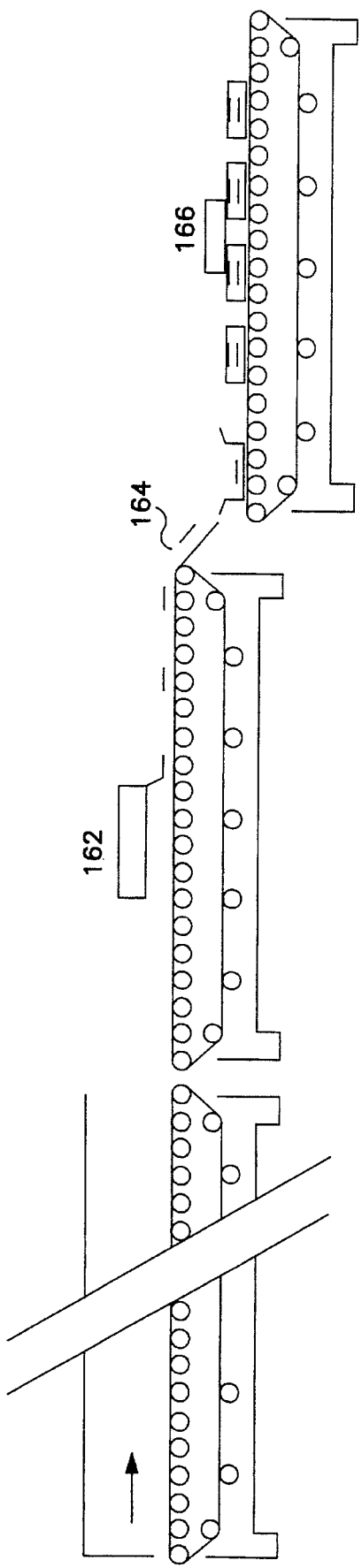
FIG. 10 is a schematic representation of the labeling and packaging system.
Figure 11A:
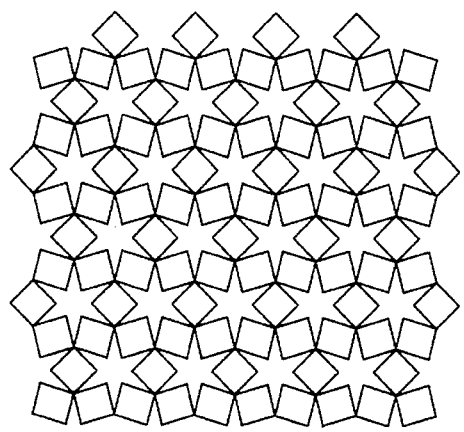
FIG. 11 shows some sample complex tiling designs produced through use of the mosaic design software diagrammed in FIG. 1.
Figure 11B:
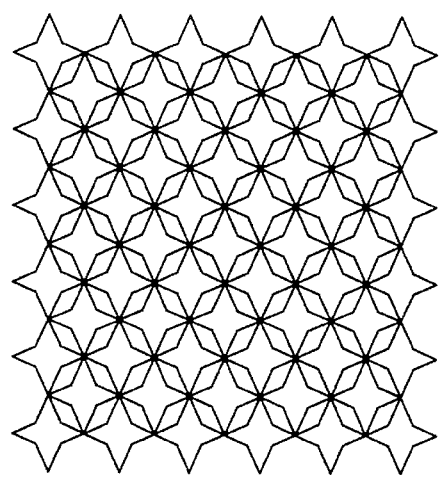
Figure 11C:
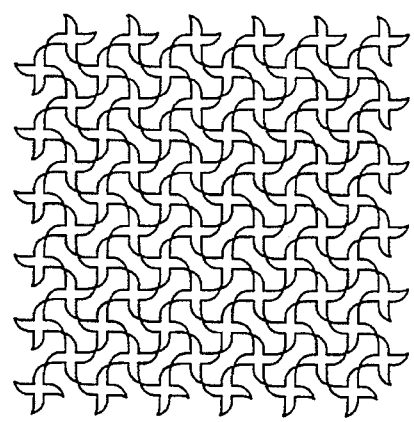
Figure 11D:
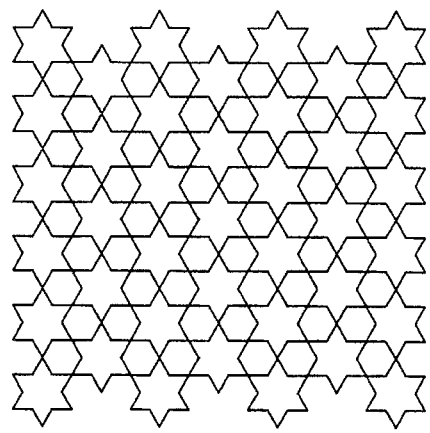
Figure 11E:
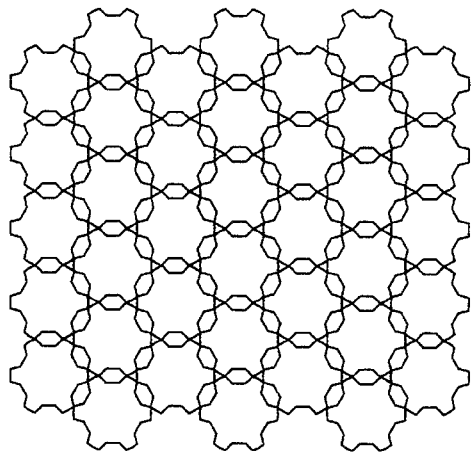
Figure 11F:
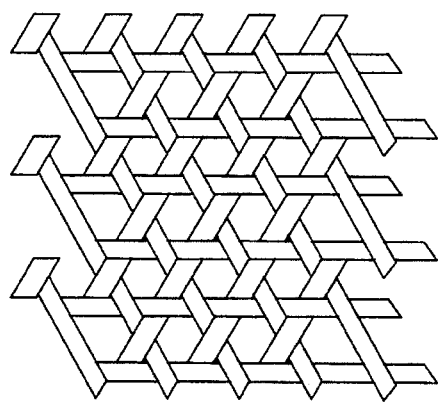
Figure 11G:
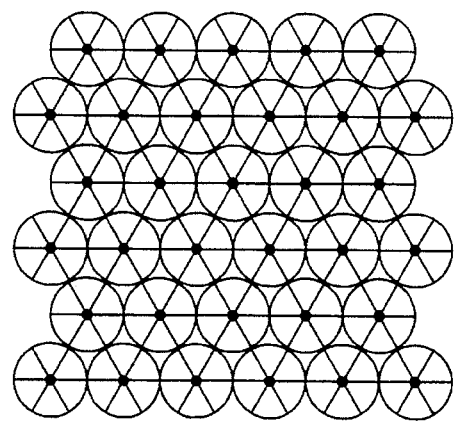
Figure 11H:
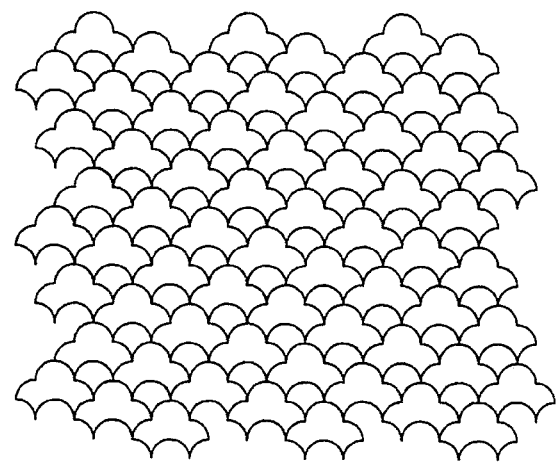
Figure 11I:
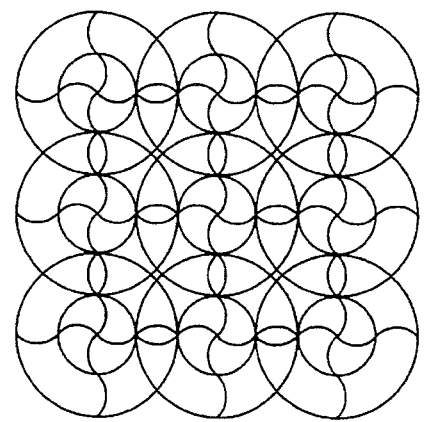

Each section thus generated from the design is converted by program 24 to computer numerical control (CNC) programs 26, 28, 30, 32 (using commercially available and custom software) which drive the tile-cutting apparatus described in FIG. 5, the trimming apparatus described in FIG. 7, the gluing apparatus described in FIG. 7, and the labeling and packaging apparatus described in FIG. 10. Control program formats other than CNC might be used.

Figure 2:
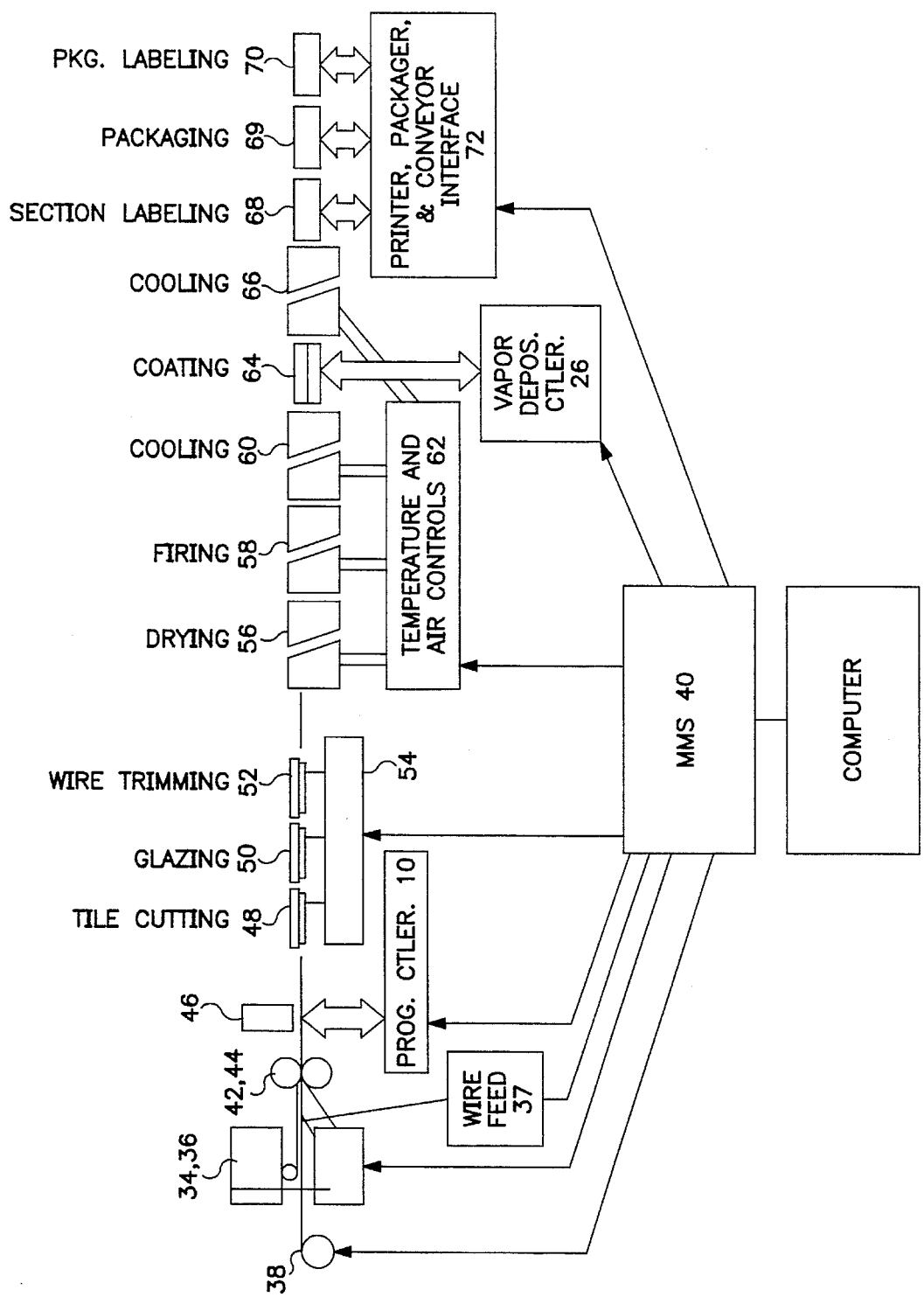
FIG. 2 is a schematic illustration of the overall mosaic manufacturing system according to a preferred embodiment of the invention.

FIG. 2 is a schematic illustration of the integrated manufacturing system. The automated manufacturing process moves materials from raw state to finished product, controlling these functions:

(1) Extrusion of two continuous slabs of clay by pug mills 34 and 36, (2) Advancing, cutting, and embedding of many parallel high-melting-point wires 38 between two converging slabs of clay, compressed by rollers 42, 44 along with a zig-zagging transverse wire 37, (3) Cutting of the continuous slab into sections of a convenient size by a strip-cutting device 46 that uses a moving water jet to remove a kerf of clay, (4) Cutting of the section slab into small tiles by an x-y positioner-mounted water jet 48, which jet also removes by successive passes clay occupying the position of incomplete tiles on the periphery of a section, tiles that will be part of adjacent sections cut from other slabs, (5) Application of glaze to the tiles by means of an x-y positioner-mounted glazing device 50, (6) Trimming of the wires extending beyond the perimeter of the section by means of an x-y positioner-mounted laser 52 (which trimming is not necessary if wires are independently advanced and cut), (7) Drying of the tiles in a drying chamber 56, (8) Firing of the tiles in a roller or conveyor kiln 58, (9) Cooling of the tiles in a cooling chamber 60, to a temperature suitable for coating in a chemical vapor deposition chamber. Controls for 56, 58, 60 are indicated at 62 and include an A-D converter and parallel I/O system to read thermocouples in the chambers and kiln and provide feedback or set point controls into the MMS for overall control of dryer, kiln, and cooling chamber.

(10) Coating of the tiles with a diamond-like coating in a chemical vapor deposition chamber 64 which has its own special computer controller 26,

(11) Cooling of the tiles in a cooling chamber 66 (also controlled via 62), to a temperature suitable for labeling and packaging,

(12) Labeling tile sections by means of a commercially available computerized label printing and label applying machine 68,

(13) Packing of a number of sections into a shipping box by means of a computerized mechanical packing machine 69,

(14) Labeling shipping boxes by means of a commercially available computerized label printing and label applying machine 70.

The tile cutting and glazing operations and all the other manufacturing operations of this invention are controlled by a computer or computers running a specific manufacturing control program component of MMS described above that schedules, initiates, and monitors operations occuring simultaneously at many points in the production line. It controls the movement of the conveyor systems that carry tile sections through each operation as they move along the production system. Its platform computer/operating system can be at personal computer or workstation level of speed, memory, and task management—e.g. an 80386-based system running UNIX. This manufacturing control system is unique for this application, but it employs standard methods and equipment wherever possible, including programmable logic controllers, PC-based stepper and servo controls, conveyors, position sensors, thermocouples, relays, etc.

EXTRUSION AND MATTING

The preferred embodiment of the process of embedding high melting point wires into a slab of clay for the purpose of physically connecting tiles that will be cut from the slab, said embodiment involving extrusion and rollers, is described. Other embodiments might use ram pressing of slabs with matting wires or expanded foil present in the mold. Some embodiments, such as those involving plastic resin tiles whose adjacent edges fuse together, might not require embedded wires. Also intended are embodiments that provide sections of ceramic tiles with a resilient backing.

Figure 4:
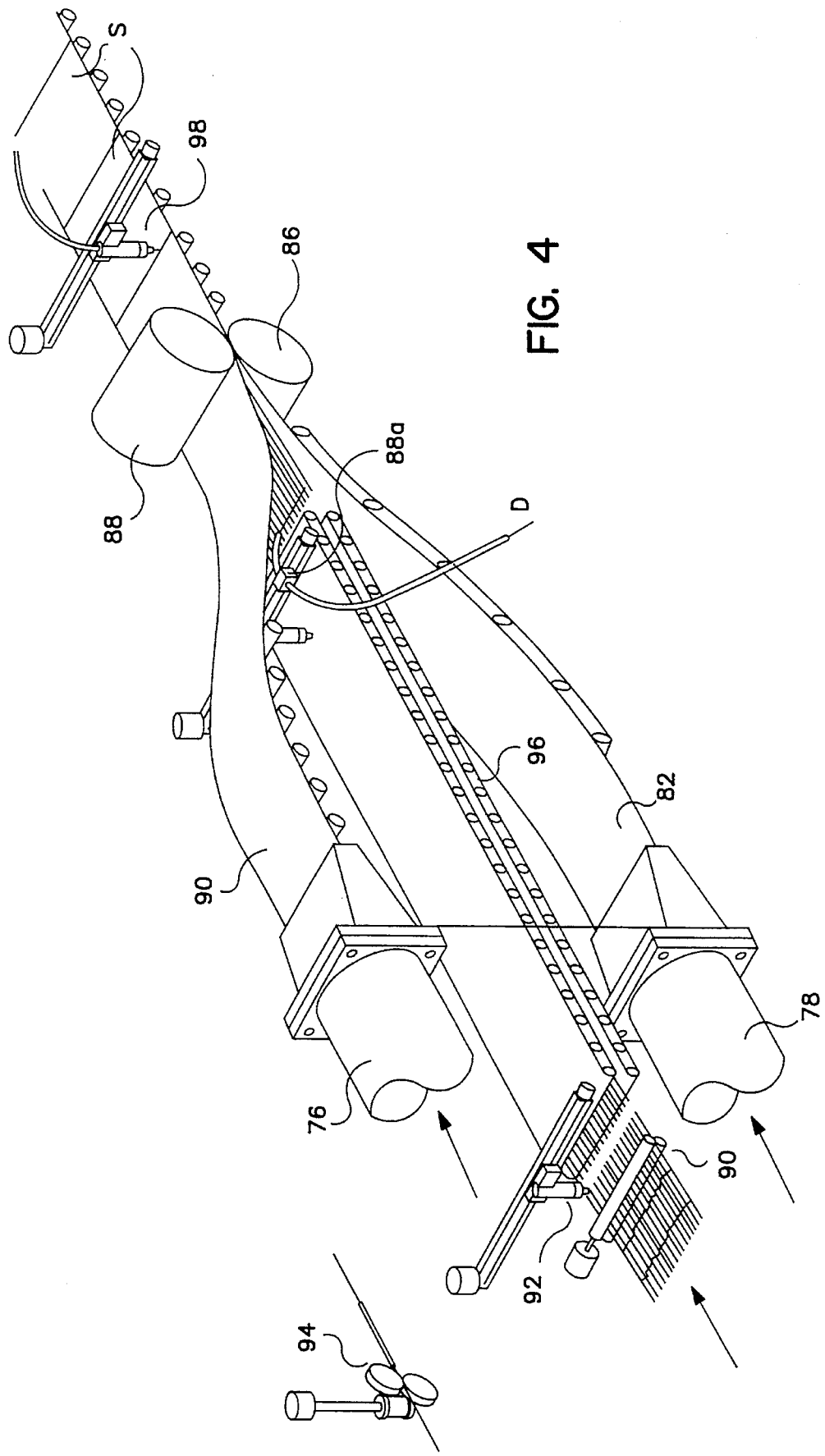
FIG. 4 is a pictorial representation of the preferred embodiment of the slab production and mesh-embedding system components in the overall production system of FIG. 2.

FIG. 4 shows the system's extrusion and matting components. Two conventional pug mills 76, 78 extrude the clay in two continuous slabs 80, 82 each with a cross-section of approximately 12"×¼". The continuous slabs are supported by rollers or belts.

Parallel strands of wire 84 are fed between the slabs as they move between a pair of rollers 86, 88 that press them together. The wires are pre-cut by some means such as a laser 92, and moved forward together by some means such as the belts 96 as shown in the figure. In one embodiment the parallel wires, before cutting, are selectively advanced by separate friction drives, one of which is shown 94, rather than together by a common friction drive 90, and selectively cut by some means such as the laser 92, so that they are of varying lengths and so that they will be present within and between all tiles within a section but not be present in areas of the clay slab that are removed when the tiles are cut by the water jet. In such an embodiment there is no need for later trimming the ends of the matting wires, and there is no waste of wire. A laterally oscillating wire-feed roller 88 feeds a strand of wire into the moving and converging slabs to produce a zig-zag pattern of wires at an angle to the parallel wires. These lateral wires add stability to the sections of tiles. The laterally oscillating wire-feed roller also can lay wire selectively, under program control, and contains a wirecutting mechanism. In the next operation a waterjet 98 translated laterally cuts the continuous clay slab to create separate, approximately square slabs S ready for cutting into multiple small wire-connected tiles.

Other embodiments include pressing wires into a single extruded slab of clay by means of a waffled roller, or an adaptation of U.S. Pat. No. 4,698,192, in which a moist ceramic slab is built up on a moving conveyor onto which slurries are deposited and dried. The matting material could be preformed screen or expanded foil instead of separate wires. The slurry could be deposited selectively to minimize time and material wasted during trimming.

Non-homogeneous alignment of clay particles in an extruded or pressed slab may lead to uneven shrinkage during drying and firing. The software that creates the CNC tile cutting program has variables to correct for this, in the same way that CAD programs provide plotter calibration routines. Similarly, uneven grout gaps due to disproportionate shrinkage along a tile's larger and shorter axes can be made more even by software that calculates for compensation.

TILE CUTTING

The next operation cuts the slabs into tiles. The computerized tile-cutting device shown in FIG. 5 consists of an x-y positioning device 102 that moves a computer-controlled nozzle 104 emitting a medium pressure (between 100 and 2000 psi) stream of water to cut a slab of clay S into small tiles T.

The x-y positioning device uses stepper motors 106, servo motors, or linear motors in combination to provide simultaneous x and y motions, in the conventional way. It is configured with an open bottom so that water passes through the clay and through the open screen belt conveying system and collects in a catchment vessel 108 below, and so that a screen-belt conveying system 110 can carry a fresh matted slab into place for cutting, pause while it is cut, and then move it through in direction B1 to the next operation, while positioning the next slab for cutting. Precise slab positioning or registration schemes are not necessary because the slab is slightly larger than the maximum x and y dimensions of the section after cutting.

The clay slab being cut is supported by a conveying screen of wires fine enough that they do not significantly interfere with the stream of water, and closely spaced enough that they adequately support the smallest tiles, preventing them from tipping. The conveying screen is supported under the cutter by several lateral knife-edge supports that prevent sagging. At other points before and after the cutting area it is suspended by rollers.

The CNC program that controls the x-y positioning motors also controls a solenoid-operated valve 112 that turns the water jet on and off. This is analogous to "pen up" and "pen down" in a plotter. The result is that a uniform slab of clay about 1 foot by 1 foot by ¼ inch is cut neatly along lines corresponding to the gaps between tiles shown in the mosaic CADD design.

Partial tiles (along the edges of the section) that the sectioning program has assigned as whole tiles in adjacent sections are removed with closely spaced parallel passes of the water jet.

Figure 6:
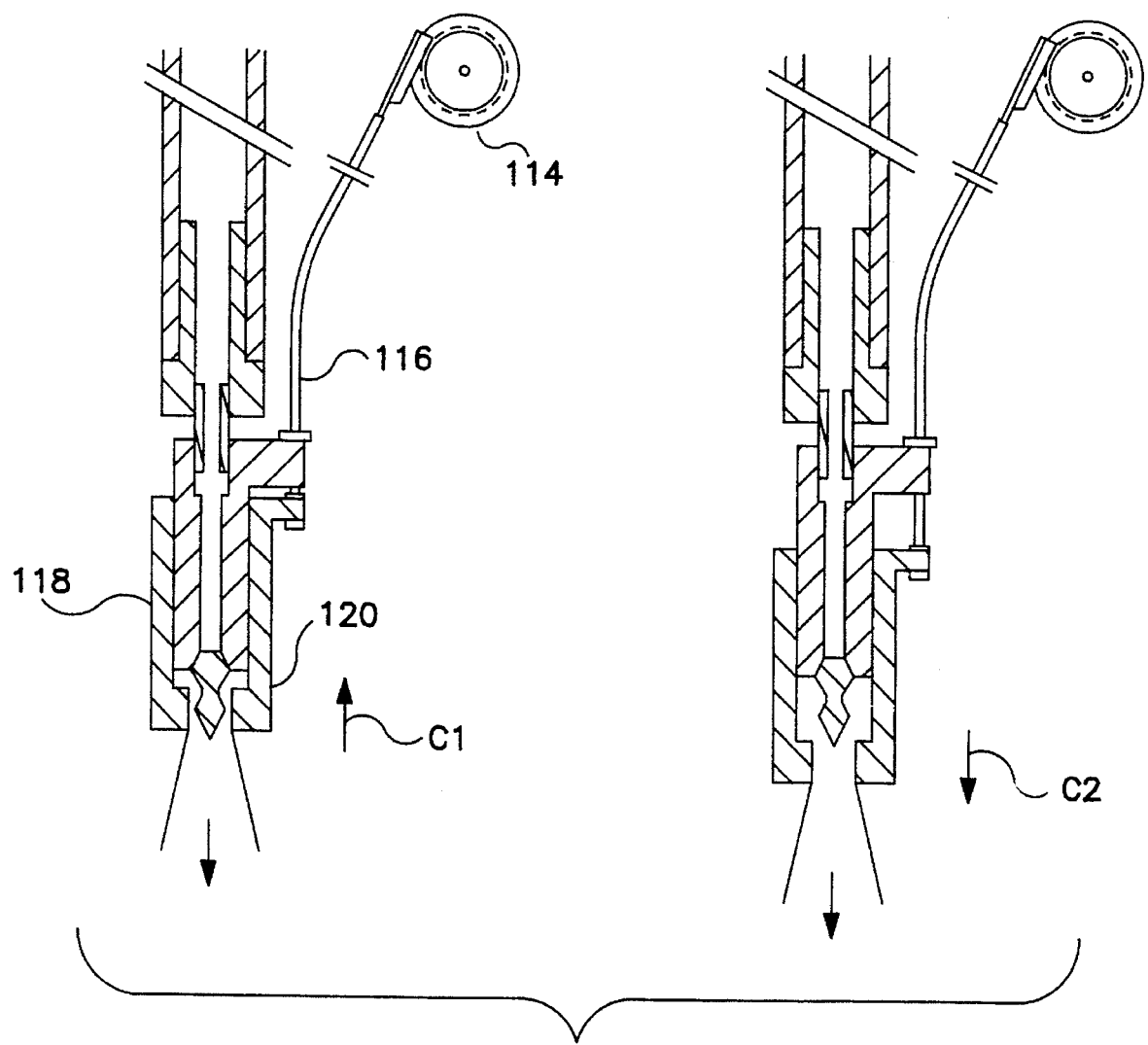
FIG. 6 is a cross-sectional pictorial representation of the computer-controlled nozzle components in the overall production system of FIG. 2.

The CNC program that controls the x-y positioner also controls the variable nozzle 104 that emits the water jet, the preferred embodiment of which nozzle is shown in FIG. 6. When the mosaic design calls for varying gap widths, expressed as line widths in the CADD drawing, the line width specification is translated into CNC code that causes the nozzle's actuating device 114, which is a stepper motor, linear motor, or similar digital actuator, which may be mounted with the nozzle on the x-y positioner or may be stationary and mechanically connected to the nozzle by a flexible enclosed cable 116, to slightly raise C1 and lower C2 the sliding nozzle outer wall part 118 relative to the fixed nozzle core 120, to produce a more or less diffuse spray, or a spray with a different pattern, depending on the shape of the walls of the nozzle and the shape of the nozzle core. The variable nozzle could be made of metal, ceramic, plastic, and/or crystalline material. In another embodiment, the moveable outer wall pan is threaded to go up and down as it turns, and it is surrounded by and turned by an attached gear that is driven by another gear that is attached to a stepper or servo motor.

This computer controlled nozzle will have applicability in operations other than mosaic manufacturing.

GLAZING AND TRIMMING

Glazing and wire trimming are performed by an apparatus depicted in FIG. 7. The glazing and wire-trimming operations can be done by a glaze-applying device and laser cutting device mounted on the same x-y positioner as the tile-cutting water jet or on other x-y positioners located further on in the production line. The advantage of common mounting is that in that case no means is required for registration, i.e., precise positioning of the glaze applier or laser relative to the tiles in a section. The slowed production rate caused by this concentration of operations at a single production cell can be compensated for by using instead of a single lane kiln a multiple lane kiln fed by multiple combination cutting/glazing/trimming cells whose output sections are assigned to lanes, tracked, and finally sorted by the scheduling software. For the sake of clarity, the tile cutting apparatus is shown in FIG. 5 and the wire-trimming and glaze-applying apparatus are shown in FIG. 7.

FIG. 7 shows an industrial laser 122 mounted on an x-y positioning device 124. The laser moves around and just outside the perimeter of the section of tiles, with its beam focussed to cut the wires 126 that protrude loosely from the outer edges of the outer tiles. This step can be eliminated if the wires are selectively cut and advanced before embedding, as described above.

Also shown attached to the x-y positioner is a group of tiny electromechanical valves or pumps 128 connected to a controller in a computer by a cable 130. The valves open and close on command from the controller to control the flow of glaze moving through tubes 132 from glaze reservoirs 134. Both gravity-fed and pressure-fed embodiments are intended as alternative embodiments, and both streams and/or droplets of glaze are intended. The group of nozzles my be a linear or rectangular array containing one or many nozzles, each releasing glaze that will fire to a different color. The glaze may be under pressure, so that it squirts from the nozzles; or the nozzle may be the outlet of a chamber partly enclosed by a small piston or diaphram that directly forces a quantity of glaze out the nozzle; or glaze may be carried by an air stream, as in an airbrush. To prevent clogging, an optional vibrator may be attached to each nozzle and activated when the nozzle is opened. The vibrator agitates and releases suspended particles that may have become compacted. The glaze might be most efficiently deposited in a raster scanning motion, but other motions, to draw continuous non-rectilinear lines of glaze, for example, are also intended. An embodiment in which glaze components are deposited, rather than premixed glazes, is also intended, as a way of mixing glazes "on the fly" to create a larger range of colors. In non-ceramic embodiments, dyes, stains, pigments, or colored resins are applied instead of glazes.

A video camera 136 is shown as a means of registration. That is, in embodiments in which glaze-applier and wire-trimming laser are not mounted on the same x-y positioner as the tile cutting nozzle, unless the conveyor provides great accuracy, the starting position of the glaze-applier and wire-trimming laser relative to the section of tiles to be operated on must be determined by some means. One means is a digital image acquired by a video camera 136 and associated frame grabber, which image is then processed digitally to produce a vector representation of the current section, which representation is then compared by software with the path that will be followed by the glaze-applier or wire-trimming laser for that section, in order to find the proper starting point. Gross mismatch signals a queueing or material handling error requiring operator intervention. Slight mismatch is compensated for by adjusting parameters of the file that controls the glazing machine. Those familiar with the art of machine vision will recognize that this registration scheme is possible with commercially available hardware and software and some custom software.

Glazing can be done before or after the tiles are fitted. Double firing, i.e., glaze application and then glaze ruing after a bisque firing, offers greater color range because the second firing can be done at a lower temperature. Also, it is easier to apply a thick and even layer of wet glaze to a bisque-fired surface than to a wet clay surface. The glazing machine shown in FIG. 7 works the same in either case. The machine vision registration scheme described above is particularly applicable in embodiments involving double-firing. In single-fire embodiments, the registration problem can be most easily overcome by using a single x-y positioner for cutting, glazing, and trimming, as explained above.

One embodiment includes attachment of a section of tiles to a piece of resilient underlayment that has the same outline as the section of tiles, or a slightly larger outline matching the centerline of the surrounding grout line. This underlayment is introduced as a square piece underneath the section of tiles after they have been fired and optionally coated, and the underlayment is trimmed in the same way that the wires are shown trimmed in FIG. 7. This embodiment is intended to include complete mosaics mounted on single pieces of underlayment that fit the entire area to be tiled.

Figure 8:
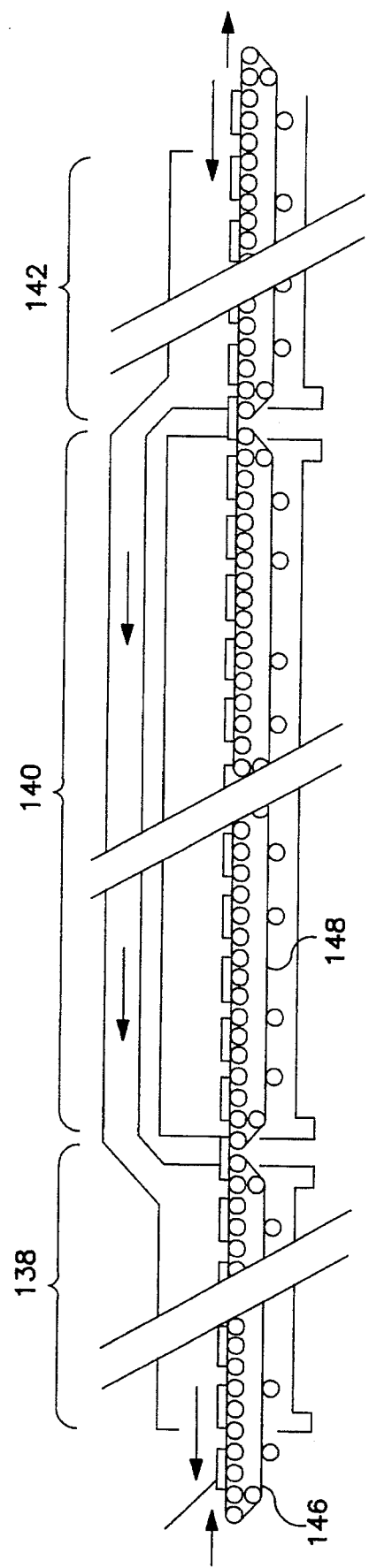
FIG. 8 is a schematic representation of the dryer, kiln, and cooling chamber components in the overall production system of FIG. 2.

FIG. 8 shows the drying oven 138, kiln 140, and cooling apparatus 142. Sections of moist clay tiles must be dried before firing. This is accomplished in a drying oven 138 that uses microwaves, infrared heat, and/or a draft of hot air ducted from the cooling apparatus. The length of the oven is determined by the rate of the conveyor and the time required to completely dry the tiles.

As the sections of tiles leave the drying oven, the conveyor 146 moves the sections to a refractory conveyor 148 that carries them into and through a kiln 140. In the kiln the sections move through temperature zones configured to provide an optimal schedule of firing. Next, the sections move onto a conveyor that carries them through a cooling apparatus 142 in which the sections are partially cooled before entering the diamond-coating system or cooled almost to room temperature for the final stage of labeling and packing.

SURFACE HARDENING

Figure 9:
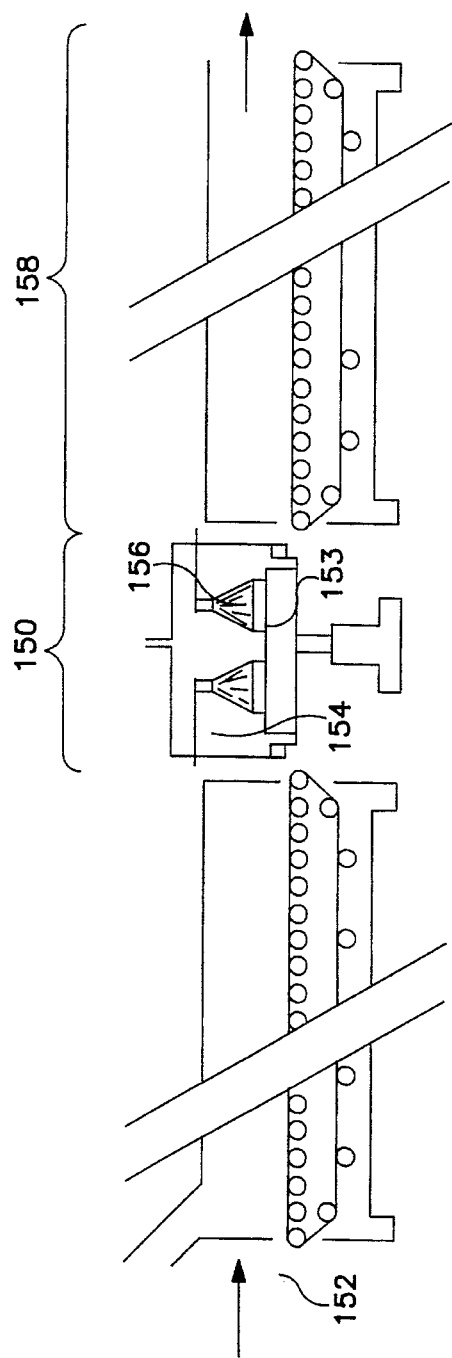
FIG. 9 is a schematic representation of the chemical vapor deposition coating process.

FIG. 9 shows a chemical vapor deposition chamber 150 in which fired and glazed sections receive a thin, ultra-hard coating. The coating operation involves methods similar to those involved in other vapor deposition applications. The conveyor moves a section (or sections) of tiles 152 from the above-mentioned cooling chamber into place on a heating element 153 in an opened chamber 154. The chamber closes and is evacuated by a vacuum pump. The section of tiles is heated to an appropriate temperature, about 700 degrees C. In the preferred embodiment, carbon-containing gases such as acetylene and carbon monoxide are introduced and turned into a plasma 156. The carbon begins to condense on tiles as diamond and as graphitic carbon, the free hydrogen combines with and removes the graphitic carbon, and the operation continues until a sufficient thickness of polycrystalline diamond has been deposited. Then the gas flow and plasma generation are stopped, the chamber is cooled, and air is allowed to enter. The chamber opens, the coated section moves out on the conveyor and into a final cooling chamber 158, and a new section is moved into place on the heating element. In other embodiments, other clear, hard coatings such as boron nitride are used instead of diamond.

Diamond has a low friction coefficient. This is a disadvantage on floors, but can be compensated for by using small sharp-edged tiles, and perhaps coating a bumpy glaze surface that has protruding points of silica or alumina.

FIG. 10 shows the labeling and packing apparatus. When the sections leave the cooling chamber after firing in the kiln or after the diamond coating process, they receive a label from a commercially available computer-driven labeling device 162. The label is attached with easy-to-remove adhesive. The label is printed with a row and column designation and a top/bottom, left/right orientation symbol that indicate its position in the overall mosaic design. It also contains the mosaic's name and customer's name. The labeled sections, and printed drawings showing the labeled sections in an overall view of the mosaic, are deposited automatically by a mechanical handling device 164 into shipping cartons. A second commercially available labeling device 166 applies a label to the shipping carton, a label that identifies the mosaic name, the owner, the shipping address, and the sections of the mosaic that are contained in the box.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

I claim:

1. Apparatus for designing and manufacturing tile mosaics, comprising, in combination:
   (a) means for patterning a plan area with tile pattern comprising special program means to facilitate mosaic design and provide a digital vector pattern to guide the automated manufacture of actual custom tiles of any size or shape,
   (b) means for dividing the resulting whole design pattern into smaller patterns for separate, sections, each containing multiple tiles, and such that there are no rectilinear seam or grid lines visibly separating the sections after installation, and such that sections may be labeled after manufacturing with a description of their place in the whole design, and
   (c) means for keeping the tiles of a section in place relative to each other within a said section and from section-to-section, said means comprising a uniform sheet precursor of the tile which has embedded wires or other embedded matting material therein maintained through all steps of manufacturing and installation, so that gap widths appear even and regular in the finished product without any handling of individual tiles.

2. Apparatus in accordance with claim 1 wherein said means for cutting a section of tiles in place comprise a tool moved by a computer-controlled x-y positioning device, such that the tiles may be of any shape, and with intentionally varying gap widths, including zero gap width, corresponding to the tiles and varying gap lines in the section of the mosaic design.

3. Apparatus in accordance with claim 1 comprising means for trimming said embedded wires around the periphery of a section of tiles either before the wires are embedded or after the tiles have been cut.

4. Apparatus in accordance with claim 1 comprising means for glazing or otherwise coloring individual tiles in a section of tiles.

5. Apparatus in accordance with claim 1 comprising means for chemical vapor deposition of hard coatings on tiles to improve wear resistance and gloss, and to enable use of brightly colored low-fire glazes on floor tiles.

6. Apparatus in accordance with claim 1 comprising means for attachment of a matted section of tiles to a piece of resilient underlayment cut to have the same outline as the section of tiles.

7. A machine in accordance with claim 2 and further comprising nozzle means and x-y positioning means that moves said nozzle means, said nozzle means being constructed to emit a stream of fluid for cutting tiles from a slab of unfired clay or other material, and means for selectively turning said stream on and off.

8. Apparatus for designing and manufacturing tile mosaics, comprising, in combination:
   (a) means for patterning a plan area with tile pattern comprising special program means to facilitate mosaic design and provide a digital vector pattern to guide the automated manufacture of actual custom tiles of any size or shape,
   (b) means for dividing the resulting whole design pattern into smaller patterns for separate, sections, each containing multiple tiles, such that three are no rectilinear seam or grid lines visibly separating the sections after installation, and such that sections may be labeled after manufacturing with a description of their place in the whole design, and
   (c) means for keeping the tiles of a section in place relative to each other within a said section and from section-to-section, said means comprising a uniform sheet precursor of the tile which has embedded wires or other embedded matting material therein maintained through all steps of manufacturing and installation, so that gap widths appear even and regular in the finished product without any handling of individual tiles, and
   (d) wherein said means for cutting a section of tiles in place comprise a tool moved by a computer-controlled x-y positioning device, such that the tiles may be of any shape, and with intentionally varying gap widths, including zero gap width, corresponding to the tiles and varying gap lines in the section of the mosaic design, and
   (e) further comprising means for trimming said embedded wires around the periphery of a section of tiles either before the wires are embedded or after the tiles have been cut, and
   (f) further comprising means for glazing or otherwise coloring individual tiles in a section of tiles, and
   (g) further comprising means for chemical vapor deposition of hard coatings on tiles to improve wear resistance and gloss, and to enable use of brightly colored low-fire glazes on floor tiles and
   (h) further comprising means for attachment of resilient underlayment to a section of tiles, for the purpose of combining the hardness and durability of ceramic tiles with the comfort and safety of resilient flooring, and to make installation easier.

9. Apparatus for designing tile mosaics, as defined in either of claims 1 or 8 wherein the set of programs for patterning a floor plan or other area to tile includes functions for: specifying a tiling for the whole plan or area or for a vector-bound region within the plan or area; designing new tilings adjusting the size of tiles that are too large or small to be manufactured; drawing a string or swath of tiles; converting a scanned image to a vector drawing for the purpose of tiling vector-bound areas; specifying the color of tiles; specifying the gap width between tiles; selecting a region or regions of tiles to manipulate, including regions that are continuous mathematically but not visually; scaling, warping, rotating, and otherwise artistically changing tilings; creating patterned tiled borders; covering three-dimensional surfaces with tiles; and automatically calculating the cost of manufacturing tiles for a particular design.

10. Apparatus for manufacturing tile mosaics, as defined in either of claims 1 or 8 wherein the means for dividing the resulting whole pattern into smaller patterns for manufacturable and installable sections containing multiple tiles is a computer program that assigns whole tiles along a shared edge of two sections or corner of four sections to one section only based on factors such as location of the tile's center or deepest protrusion into the area of any of the sections, for the purpose of completely avoiding visible rectilinear seam or grid lines between sections after installation, said program also finding too-small-to-manufacture tiles at the edges of the design and merging the too-small tiles with adjacent tiles in ways that least affect the integrity of the design.

11. Apparatus for manufacturing tile mosaics, as defined in either of claims 2 or 8 wherein the means for keeping the tiles of a section in place relative to each other through cutting, glazing, firing, packing, shipping, and installation is an embedded mesh or wire or other embedded matting material with a sufficiently high melting point and corrosion resistance to remain intact through firing or other manufacturing processes, which wires or other embedded matting material are sandwiched or pressed into the raw material before cutting, and which wires or other embedded matting materials are fine enough not to significantly interfere with said tool.

12. Apparatus for manufacturing tile mosaics, as defined in either of claims 2 or 8 wherein the means for cutting a section of tiles is a jet of fluid flowing from a nozzle mounted on a computer-controlled x-y positioning device.

13. Apparatus for manufacturing tile mosaics, as defined in either of claims 3 or 8 wherein the embedded wires are trimmed by a laser focussed for cutting and mounted on a computer-controlled x-y positioning device which follows a path derived from the program that defines the path of cutting.

14. Apparatus for manufacturing tile mosaics, as defined in either of claims 4 or 8 and further comprising means to deliver droplets or streams of glaze or other coloring material flowing from a set of small nozzles mounted on a computer-controlled x-y positioning device to the tiles.

15. Apparatus for manufacturing tile mosaics, as defined in either of claims 5 or 8 wherein means are provided to enable the tiles optionally to receive a thin coating of a clear polycrystalline or crystalline hard material by chemical vapor deposition.

16. Apparatus for manufacturing tile mosaics, as defined in either of claims 5 or 8 wherein means are provided to attach a piece of resilient underlayment to a section of tiles that has the same outline as the section of tiles.

17. Apparatus for manufacturing tile mosaics, as defined in claim 8 wherein all the steps of tile manufacture, including, in the preferred embodiment described, but not limited to manufacture of ceramic tiles, production of uncut slabs, embedding of wire mesh, cutting, glazing, trimming, drying, preheating, firing, cooling, coating, labeling, and packaging are coordinated by a common control means.

18. Process for designing and manufacturing tile mosaics, comprising, in combination the steps of:

(a) patterning a plan area with tile patterns comprising special program means to facilitate mosaic design and provide a digital vector pattern to guide the automated manufacture of actual custom tiles, (b) dividing the resulting whole patterned design into smaller patterns for separate, sections, each containing multiple tiles, such that there are no rectilinear seam or grid lines visibly separating the sections after installation, and such that sections may be labeled after manufacturing with a description of their place in the whole design, and (c) keeping the tiles of a section in place relative to each other within a said section and from section to section, said step comprising production of a uniform sheet precursor of the tiles which has embedded wires or other embedded matting material therein maintained through all steps of manufacturing and installation, so that gap widths appear even and regular in the finished product without any handling of individual tiles.

19. Process in accordance with claim 18 wherein said step of cutting a section of tiles in place is performed by a tool mounted on a computer-driven x-y positioning device capable of omnidirectional vectoring, such that the tiles may be of any shape, and with intentionally varying gap widths, including zero gap width, corresponding to the tiles and varying gap fines in the section of the mosaic design.

20. Process in accordance with claim 18 and further comprising the step of trimming said embedded wires around the periphery of a section of tiles after the tiles have been cut, or cutting and advancing them under control of operational commands before they are embedded so that no trimming is necessary.

21. Process in accordance with claim 15 and further comprising the step of glazing or otherwise coloring individual tiles in a section of tiles.

22. Process in accordance with claim 18 and further comprising the step of chemical vapor deposition of hard coatings on tiles to improve wear resistance and gloss, and to enable use of brightly colored low-fire glazes on floor tiles.

23. Process in accordance with claim 18 and further comprising the step of attaching to a section of tiles a piece of resilient underlayment that has the same outline as the section of tiles.

24. Process for designing tile mosaics, as defined in claim 18 wherein the patterning of a floor plan or other area to tile includes specifying a tiling for the whole plan or area or for a vector-bound region within the plan or area; designing new tilings; adjusting the size of tiles that are too large or small to be manufactured; drawing a string or swath of tiles; convening a scanned image to a vector drawing for the purpose of tiling vector-bound areas; specifying the color of tiles; specifying the gap width between tiles; selecting a region or regions of tiles to manipulate, including regions that are continuous mathematically but not visually; scaling, warping, rotating, and otherwise artistically changing tilings; creating patterned tiled borders; covering three-dimensional surfaces with tiles; and automatically calculating the cost of manufacturing tiles for a particular design.

25. Process for manufacturing tile mosaics, as defined in claim 18 wherein the step of dividing the resulting whole pattern into smaller patterns for manufacturable and installable sections is performed by a computer program that assigns whole tiles along a shared edge of two sections or corner of four sections to one section only based on factors such as location of the tile's center or deepest protrusion into the area of any of the sections, for the purpose of completely avoiding visible rectilinear seam or grid lines between sections after installation, said program also finding too-small-to-manufacture tiles at the edges of the design and merging the too-small tiles with adjacent tiles in ways that least affect the integrity of the design.

26. Process for manufacturing tile mosaics, as defined in claim 18 wherein the step of cutting a section of tiles involves a jet of fluid flowing from a nozzle mounted on a computer-controlled x-y positioning device, and the step of keeping the tiles of a section in place relative to each other through cutting, glazing, firing, packing, shipping, and installation involves the use of an embedded mesh of wire or fibers, or row(s) of parallel wires or fibers, or open felt of wires or fibers, or expanded foil, with a sufficiently high melting point and corrosion resistance to remain intact through firing or other manufacturing processes, the wire of fibers of which row or mesh are sandwiched or pressed into the raw material before cutting, and which wires or fibers are fine enough not to significantly interfere with said fluid jet.

27. Process for manufacturing tile mosaics, as defined in claim 19 wherein the step of cutting a section of tiles involves a jet of fluid flowing from a nozzle mounted on a computer-controlled x-y positioning device.

28. Process for manufacturing tile mosaics, as defined in claim 20 wherein the embedded wires are trimmed before or after embedding by a laser focussed for cutting and mounted on a computer-controlled x-y positioning device which follows a path derived from the program that defines the path for tile cutting.

29. Process for manufacturing tile mosaics, as defined in claim 21 and further comprising a step to deliver droplets or streams of glaze, glaze components, or other coloring material flowing from a set of small nozzles mounted on a computer-controlled x-y positioning device to the tiles.

30. Process for manufacturing tile mosaics, as defined in claim 22 wherein a step is provided to enable the tiles optionally to receive a thin coating of a clear polycrystalline or crystalline hard material by chemical vapor deposition.

31. Process for manufacturing tile mosaics, as defined in claim 23 wherein a step is provided to enable a section of tiles to be attached to a piece of resilient underlayment having the same outline as the section of tiles.

* * * * *